(12) United States Patent
Tahara et al.

(10) Patent No.: US 11,417,868 B2
(45) Date of Patent: Aug. 16, 2022

(54) MANUFACTURING METHOD FOR SECONDARY BATTERY

(71) Applicant: Murata Manufacturing Co., Ltd., Nagaokakyo (JP)

(72) Inventors: Retsu Tahara, Nagaokakyo (JP); Toru Kawai, Nagaokakyo (JP); Masahiro Otsuka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 103 days.

(21) Appl. No.: 16/743,209

(22) Filed: Jan. 15, 2020

(65) Prior Publication Data

US 2020/0152959 A1 May 14, 2020

Related U.S. Application Data

(63) Continuation of application No. PCT/JP2018/026519, filed on Jul. 13, 2018.

(30) Foreign Application Priority Data

Jul. 24, 2017 (JP) .............................. JP2017-142891

(51) Int. Cl.
  *H01M 4/04* (2006.01)
  *H01M 4/66* (2006.01)

(52) U.S. Cl.
  CPC ......... *H01M 4/0404* (2013.01); *H01M 4/661* (2013.01)

(58) Field of Classification Search
  CPC .............................. B05C 5/027; B05C 5/0279
  See application file for complete search history.

(56) References Cited

U.S. PATENT DOCUMENTS

| | | | |
|---|---|---|---|
| 2016/0282770 A1* | 9/2016 | Seko | ................. G03G 15/1615 |
| 2017/0110713 A1* | 4/2017 | Otsuka | .................. H01G 11/52 |

FOREIGN PATENT DOCUMENTS

| | | | |
|---|---|---|---|
| JP | 201141892 A | | 3/2011 |
| JP | 201465021 A | | 4/2014 |
| JP | 2014065021 | * | 4/2014 |
| JP | 2015112520 A | | 6/2015 |
| KR | 101641095 | * | 9/2017 |
| WO | WO 2016006420 | * | 1/2014 |
| WO | 2016006420 A1 | | 1/2016 |
| WO | 2017208537 A1 | | 12/2017 |

OTHER PUBLICATIONS

Machine translation of document N.*
Machine translation of document O.*
International Search Report issued for PCT/JP2018/026519, dated Oct. 2, 2018.
Written Opinion of the International Searching Authority issued for PCT/JP2018/026519, dated Oct. 2, 2018.

* cited by examiner

*Primary Examiner* — Austin Murata
(74) *Attorney, Agent, or Firm* — ArentFox Schiff LLP

(57) ABSTRACT

A manufacturing method for a secondary battery that includes coating a metal current collector sheet material with an electrode material layer raw material such that a shape of a coating surface of the electrode material layer raw material is changed based on a shape of a non-rectangular electrode to be formed to form an electrode precursor, and cutting the electrode precursor into a non-rectangular electrode shape.

14 Claims, 9 Drawing Sheets

MANUFACTURING METHOD FOR SECONDARY BATTERY

CROSS REFERENCE TO RELATED APPLICATIONS

The present application is a continuation of International application No. PCT/JP2018/026519, filed Jul. 13, 2018, which claims priority to Japanese Patent Application No. 2017-142891, filed Jul. 24, 2017, the entire contents of each of which are incorporated herein by reference.

FIELD OF THE INVENTION

The present invention relates to a manufacturing method for a secondary battery.

BACKGROUND OF THE INVENTION

A secondary battery that can be repeatedly charged and discharged has been used for various purposes. For example, the secondary battery is used as a power source for an electronic device such as a smartphone and a notebook computer.

The secondary battery includes at least a positive electrode, a negative electrode, and a separator between them. The positive electrode includes a positive electrode material layer and a positive electrode current collector, and the negative electrode includes a negative electrode material layer and a negative electrode current collector.

The positive electrode and the negative electrode are formed mainly through the following steps. Specifically, by using a die head, a metal sheet material to be a current collector is coated with an electrode material layer raw material to form an electrode precursor, and then the electrode precursor is cut to obtain a plurality of positive or negative electrodes.

Note that, as a coating method for the electrode material layer raw material, a continuous coating method and an intermittent coating method can be used. The continuous coating method is a method in which an electrode material layer raw material is continuously applied to a moving metal sheet material in one direction by using a die head (see Patent Document 1). On the other hand, the intermittent coating method is a method in which an electrode material layer raw material is intermittently applied onto a moving metal sheet material in one direction by using a die head (see Patent Document 2).

Patent Document 1: Japanese Patent Application Laid-Open No. 2011-41892
Patent Document 2: Japanese Patent Application Laid-Open No. 2015-112520

SUMMARY OF THE INVENTION

Here, inventors of the present application have found that the following problem may occur when an electrode precursor obtained by coating a metal sheet material to be a current collector with an electrode material layer raw material is cut to obtain an electrode (see FIGS. 9(i) and 9(ii)).

Specifically, a metal sheet material 110' is coated with an electrode material layer raw material 120' to form an electrode precursor 100', and then the electrode precursor 100' is cut to form a plurality of non-rectangular electrodes 10'. In this case, an amount of a surplus portion 100X' of the electrode precursor 100' after the cutting can be relatively larger than that in a case of forming a plurality of rectangular electrodes. Since the surplus portion 100' of the electrode precursor 100' can be discarded without being reused at present, when the amount of the surplus portion 100X' is relatively large, a discard amount can be relatively large accordingly. Such an increase in the discard amount of the surplus portion 100' of the electrode precursor 100' can lead to a decrease in manufacturing efficiency of the non-rectangular electrode 10'. As a result, manufacturing efficiency of a secondary battery including the non-rectangular electrodes 10' as a whole can be reduced.

The present invention has been made in view of such circumstances. A main object of the present invention is to provide a manufacturing method for a secondary battery capable of improving manufacturing efficiency of a non-rectangular electrode.

In order to achieve the above object, one embodiment of the present invention provides a manufacturing method for a secondary battery that includes coating a metal current collector sheet material with an electrode material layer raw material such that a shape of a coating surface of the electrode material layer raw material is changed based on a shape of a non-rectangular electrode to be formed to form an electrode precursor, and cutting the electrode precursor into a non-rectangular electrode shape.

According to one embodiment of the present invention, manufacturing efficiency of the non-rectangular electrode can be improved.

DETAILED DESCRIPTION OF THE INVENTION

Figure 1A:
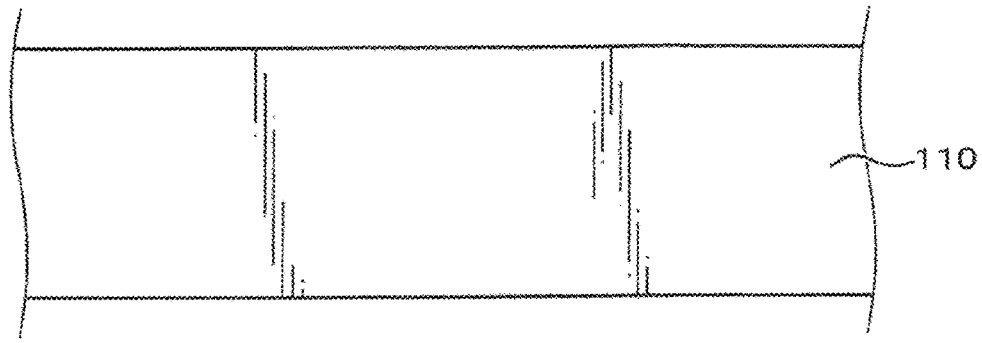
FIGS. 1(a) to 1(c) are schematic views of a manufacturing flow of a non-rectangular electrode of a secondary battery according to an embodiment of the present invention.

Before describing a manufacturing method for a secondary battery according to an embodiment of the present invention, a basic configuration of the secondary battery will be described. Note that a term "secondary battery" used in the present specification refers to a battery that can be repeatedly charged and discharged. "Secondary battery" is not excessively bound by the name, and may include, for example, "electric storage device." "Plan view" used herein refers to a state when an object is viewed from an upper side or a lower side along a thickness direction based on a laminating direction of electrode materials constituting a secondary battery. In addition, "cross-sectional view" used herein refers to a state when viewed from a direction substantially perpendicular to a thickness direction based on a laminating direction of electrode materials constituting a secondary battery.

[Basic Configuration of Secondary Battery]

In the present invention, a secondary battery is provided. "Secondary battery" used in the present specification refers to a battery that can be repeatedly charged and discharged. Therefore, the secondary battery of the present invention is not excessively bound by its name, and for example, "electric storage device" can be included in an object of the present invention. The secondary battery has a structure in which an electrode assembly and an electrolyte are accommodated and enclosed in an exterior body. In the present invention, it is assumed that the electrode assembly has a planar laminated structure in which a plurality of electrode constituent layers each including a positive electrode, a negative electrode, and a separator is laminated. Further, the exterior body may take a form of a conductive hard case or a flexible case (such as a pouch). When the form of the outer package is a flexible case (pouch or the like), each of the plurality of positive electrodes is connected to a positive electrode external terminal with a positive electrode current collecting lead interposed therebetween. The positive electrode external terminal is fixed to the exterior body by a seal portion, and the seal portion prevents electrolyte leakage. Similarly, each of the plurality of negative electrodes is connected to a negative electrode external terminal with a negative electrode current collecting lead interposed therebetween. The negative electrode external terminal is fixed to the exterior body by a seal portion, and the seal portion prevents electrolyte leakage. Note that the present invention is not limited to this, and the positive electrode current collecting lead connected to each of the plurality of positive electrodes may have a function of the positive electrode external terminal, and the negative electrode current collecting lead connected to each of the plurality of negative electrodes may have a function of the negative electrode external terminal. When the form of the exterior body is a conductive hard case, each of the plurality of positive electrodes is connected to a positive electrode external terminal with a positive electrode current collecting lead interposed therebetween. The positive electrode external terminal is fixed to the exterior body by a seal portion, and the seal portion prevents electrolyte leakage.

Figure 8:
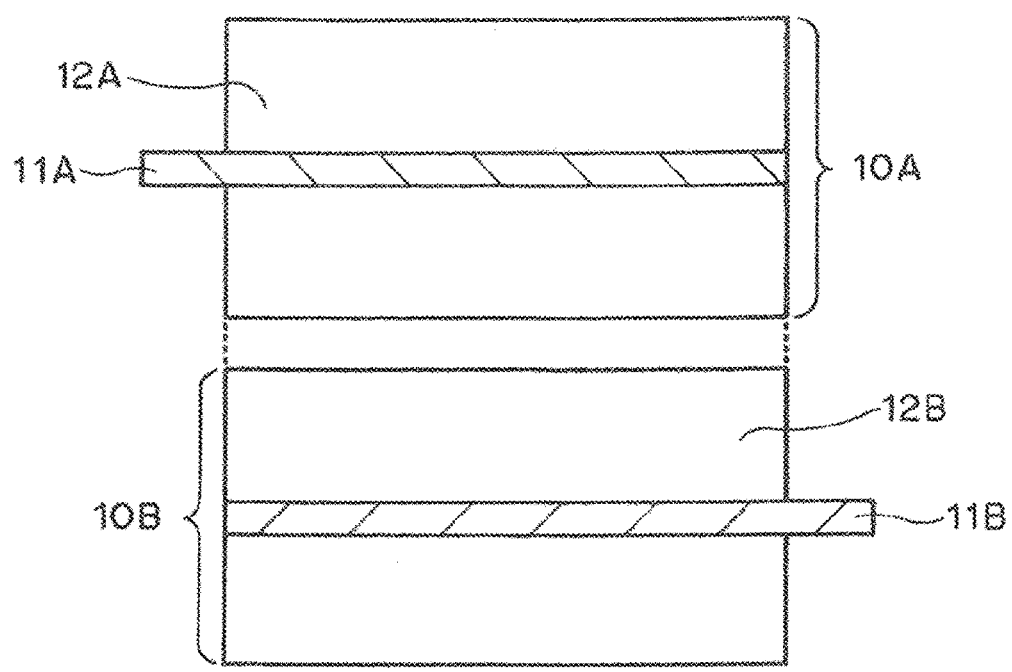
FIG. 8 is a cross-sectional view schematically showing a basic configuration of an electrode constituent layer.
Figure 9I:
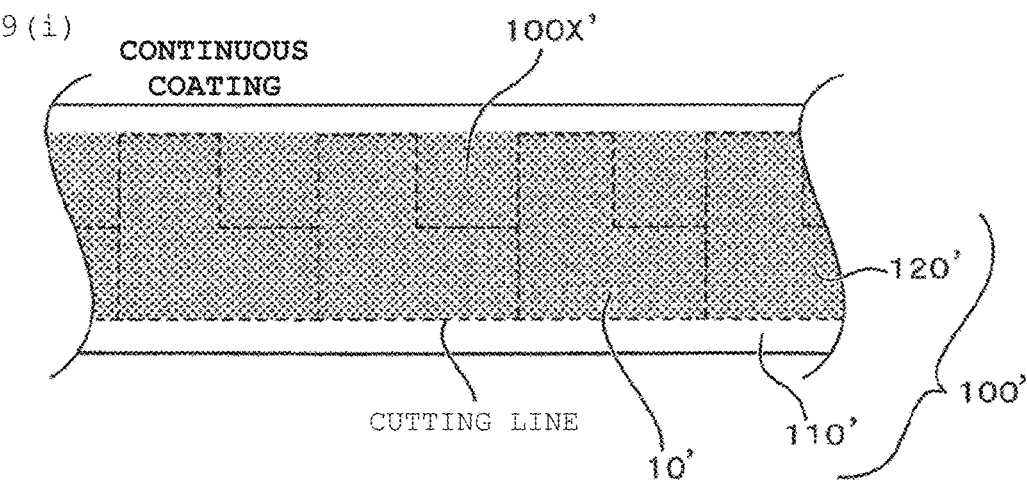
FIGS. 9(i) and 9(ii) are schematic views showing a technical problem found by inventors of the present application.
Figure 9:
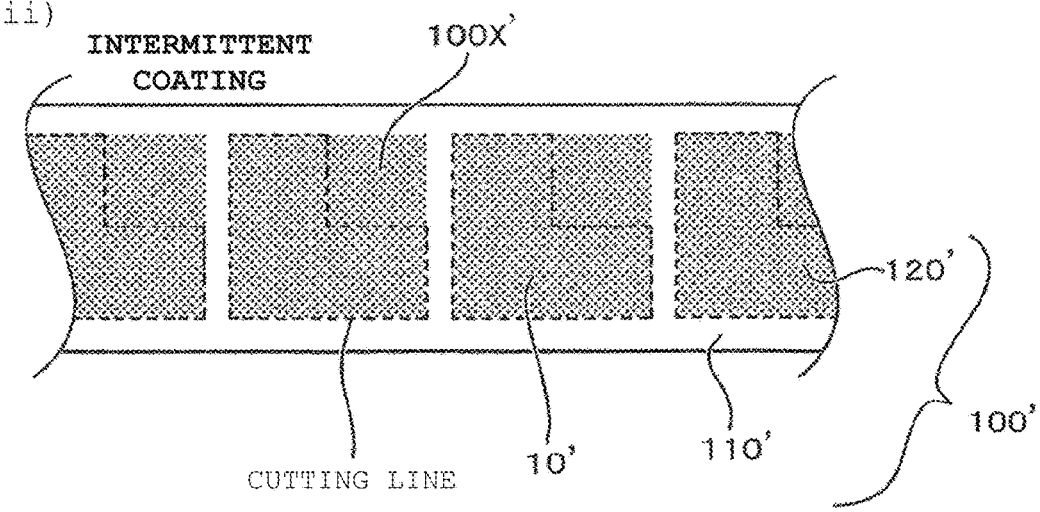

A positive electrode 10A includes at least a positive electrode current collector 11A and a positive electrode material layer 12A (see FIG. 8), and the positive electrode material layer 12A is provided on at least one surface of the positive electrode current collector 11A. In the positive electrode current collector 11A, a positive electrode side extended tab is positioned at a location where the positive electrode material layer 12A is not provided, that is, at an end of the positive electrode current collector 11A. The positive electrode material layer 12A contains a positive electrode active material as an electrode active material. A negative electrode 10B includes at least a negative electrode current collector 11B and a negative electrode material layer 12B (see FIG. 8), and the negative electrode material layer 12B is provided on at least one surface of the negative electrode current collector 11B. In the negative electrode current collector 11B, a negative electrode side extended tab is positioned at a location where the negative electrode material layer 12B is not provided, that is, at an end of the negative electrode current collector 11B. The negative electrode material layer 12B contains a negative electrode active material as an electrode active material. Note that, in the above description, it is stated that the electrode assembly is based on the premise that the plurality of electrode constituent layers each including the positive electrode, the negative electrode, and the separator is laminated. However, without being limited thereto, the electrode assembly may include at least one electrode constituent layer having a positive electrode, a negative electrode, and a separator. In other words, each of the positive electrode and the negative electrode, which are constituent elements of the electrode assembly, may be at least one layer. When one layer of each of the positive electrode and the negative electrode is provided, it can function as a battery. Further, when at least two layers of the positive electrode and the negative electrode are provided, they can function as a battery and can increase a battery capacitance due to an increase in the number (the number of positive electrodes/negative electrodes).

The positive electrode active material contained in the positive electrode material layer 12A and the negative electrode active material contained in the negative electrode material layer 12B are materials directly involved in transfer of electrons in the secondary battery, and are main positive and negative electrode materials responsible for charge and discharge, that is, battery reaction. More specifically, ions are brought into an electrolyte due to "positive electrode active material included in positive electrode material layer 12A" and "negative electrode active material included in negative electrode material layer 12B." These ions move between the positive electrode 10A and the negative electrode 10B to transfer the electrons and perform charge and discharge. It is particularly preferable that the positive electrode material layer 12A and the negative electrode material layer 12B be layers capable of occluding and releasing lithium ions. In other words, it is preferable to have a secondary battery in which lithium ions move between the positive electrode 10A and the negative electrode 10B through the electrolyte to perform charge and discharge of a battery. When the lithium ions are involved in the charge and discharge, the secondary battery corresponds to a so-called "lithium ion battery."

The positive electrode active material of the positive electrode material layer 12A is made of, for example, a granular material, and a binder is preferably included in the positive electrode material layer 12A for more sufficient contact between grains and shape retention. Furthermore, a conductive auxiliary agent may be included in the positive electrode material layer 12A to facilitate transfer of electrons that promotes battery reaction. Similarly, the negative electrode active material of the negative electrode material layer 12B is made of, for example, a granular material, and a binder is preferably included in the negative electrode material layer 12B for more sufficient contact between grains and shape retention. A conductive auxiliary agent may be included in the negative electrode material layer 12B to facilitate transfer of electrons that promotes battery reaction. Thus, because of the form in which a plurality of components is contained, the positive electrode material layer 12A and the negative electrode material layer 12B can also be referred to as "positive electrode mixture layer" and "negative electrode mixture layer", respectively.

The positive electrode active material is preferably a material that contributes to occlusion and release of lithium ions. From this point of view, the positive electrode active material is preferably, for example, a lithium-containing composite oxide. More specifically, the positive electrode active material is preferably a lithium transition metal composite oxide containing lithium and at least one transition metal selected from the group consisting of cobalt, nickel, manganese, and iron. In other words, such a lithium transition metal composite oxide is preferably included as the positive electrode active material in the positive electrode material layer 12A of the secondary battery. For example, the positive electrode active material may be lithium cobalt oxide, lithium nickelate, lithium manganate, lithium iron phosphate, or a part of those transition metals replaced with another metal. Such a positive electrode active material may be included as a single type, and may be included by combining two or more types. In a more preferred embodiment, the positive electrode active material included in the positive electrode material layer 12A is lithium cobalt oxide.

The binder that can be included in the positive electrode material layer 12A is not particularly limited, and examples thereof include at least one selected from the group consisting of polyvinylidene fluoride, vinylidene fluoride-hexafluoropropylene copolymer, and vinylidene fluoride-tetrafluorothylene copolymer, polytetrafluorothylene, and the like. The conductive auxiliary agent that can be included in the positive electrode material layer 12A is not particularly limited, and examples thereof include at least one selected from: carbon black such as thermal black, furnace black, channel black, ketjen black, and acetylene black; carbon fiber such as graphite, carbon nanotube, and vapor grown carbon fiber; metal powder such as copper, nickel, aluminum, and silver; and a polyphenylene derivative. For example, the binder of the positive electrode material layer 12A may be polyvinylidene fluoride. By way of example, the conductive auxiliary agent of the positive electrode material layer 12A is carbon black. Furthermore, the binder and the conductive auxiliary agent of the positive electrode material layer 12A may be a combination of polyvinylidene fluoride and carbon black.

The negative electrode active material is preferably a material that contributes to occlusion and release of lithium ions. From this point of view, the negative electrode active material is preferably, for example, various carbon materials, an oxide, or a lithium alloy.

Examples of various carbon materials of the negative electrode active material include graphite (natural graphite, artificial graphite), soft carbon, hard carbon, and diamond-like carbon. In particular, graphite is preferable in that it has high electron conductivity and excellent adhesion to the negative electrode current collector 11B. Examples of the oxide of the negative electrode active material include at least one selected from the group consisting of silicon oxide, tin oxide, indium oxide, zinc oxide, and lithium oxide. The lithium alloy of the negative electrode active material may be any metal that can be alloyed with lithium. For example, it may be a binary, ternary, or higher alloy of lithium and metal such as Al, Si, Pb, Sn, In, Bi, Ag, Ba, Ca, Hg, Pd, Pt, Te, Zn, or La. Such an oxide is preferably amorphous in its structural form. This is because deterioration due to non-uniformity such as a crystal grain boundary or a defect is less likely to be caused. By way of example, the negative electrode active material of the negative electrode material layer 12B may be artificial graphite.

The binder that can be included in the negative electrode material layer 12B is not particularly limited, and examples thereof include at least one selected from the group consisting of styrene butadiene rubber, polyacrylic acid, polyvinylidene fluoride, polyimide resin, and polyamideimide resin. For example, the binder included in the negative electrode material layer 12B may be styrene butadiene rubber. The conductive auxiliary agent that can be included in the negative electrode material layer 12B is not particularly limited, and examples thereof include at least one selected from: carbon black such as thermal black, furnace black, channel black, ketjen black, and acetylene black; carbon fiber such as graphite, carbon nanotube, and vapor grown carbon fiber; metal powder such as copper, nickel, aluminum, and silver; and a polyphenylene derivative. Note that the negative electrode material layer 12B may contain a component resulting from a thickener component (for example, carboxymethylcellulose) used during battery manufacture.

By way of example, the negative electrode active material and the binder in the negative electrode material layer 12B may be a combination of artificial graphite and styrene butadiene rubber.

The positive electrode current collector 11A and the negative electrode current collector 11B used for the positive electrode 10A and the negative electrode 10B are members that contribute to collecting and supplying electrons generated in the active materials due to the battery reaction. Such a current collector may be a sheet-like metal member, and may have a porous or perforated form. For example, the current collector may be a metal foil, a punching metal, a net, or an expanded metal. The positive electrode current collector 11A used for the positive electrode 10A is preferably made of a metal foil containing at least one selected from the group consisting of aluminum, stainless steel, nickel, and the like, and may be, for example, an aluminum foil. On the other hand, the negative electrode current collector 11B used for the negative electrode 10B is preferably made of a metal foil containing at least one selected from the group consisting of copper, stainless steel, nickel, and the like, and may be, for example, a copper foil.

A separator (not shown in FIG. 8, but would be positioned between the positive and negative electrodes 10A and 10B) is a member provided from the viewpoints of preventing a short circuit due to contact between the positive and negative electrodes and of holding the electrolyte. In other words, it can be said that the separator is a member that allows ions to pass while preventing electronic contact between the positive electrode 10A and the negative electrode 10B. Preferably, the separator is a porous or microporous insulating member and has a film form due to its small thickness. By way of example, a polyolefin microporous membrane may be used as the separator. In this regard, the microporous membrane used as the separator may include, for example, only polyethylene (PE) or only polypropylene (PP) as the polyolefin. Furthermore, the separator may be a laminate including "PE microporous membrane" and "PP microporous membrane." A surface of the separator may be covered with an inorganic particle coat layer and/or an adhesive layer. The surface of the separator may have adhesiveness.

Note that the separator is not particularly limited by its name, and may be a solid electrolyte, a gel electrolyte, insulating inorganic particles, or the like having the same function. Note that from the viewpoint of further improving handling of the electrode, it is preferable that the separator and the electrode (positive electrode 10A/negative electrode 10B) are bonded. The separator can be bonded to the electrode by using an adhesive separator as the separator, by applying and/or thermal pressure bonding an adhesive binder onto the electrode material layer (positive electrode material layer 12A/negative electrode material layer 12B), and the like. Examples of the adhesive binder material that provides adhesion to the separator or the electrode material layer include polyvinylidene fluoride, vinylidene fluoride-hexafluoropropylene polymer, and acrylic resin. A thickness of the adhesive layer by application of the adhesive binder or the like may be 0.5 μm or more and 5 μm or less.

When the positive electrode 10A and the negative electrode 10B have a layer capable of occluding and releasing lithium ions, the electrolyte is preferably "non-aqueous" electrolyte such as an organic electrolyte and/or an organic solvent (that is, the electrolyte is preferably a non-aqueous electrolyte). In the electrolyte, metal ions released from the electrodes (the positive electrode 10A and the negative electrode 10B) exist, and therefore the electrolyte assists movement of the metal ions in the battery reaction.

A nonaqueous electrolyte is an electrolyte containing a solvent and a solute. As a specific nonaqueous electrolyte solvent, a solvent containing at least carbonate is preferable. Such a carbonate may be cyclic carbonates and/or chain carbonates. Although not particularly limited, examples of the cyclic carbonates include at least one selected from the group consisting of propylene carbonate (PC), ethylene carbonate (EC), butylene carbonate (BC), and vinylene carbonate (VC). Examples of the chain carbonates include at least one selected from the group consisting of dimethyl carbonate (DMC), diethyl carbonate (DEC), ethyl methyl carbonate (EMC), and dipropyl carbonate (DPC). By way of example, a combination of the cyclic carbonates and the chain carbonates is used as a nonaqueous electrolyte, and for example, a mixture of ethylene carbonate and diethyl carbonate may be used. Further, as a specific nonaqueous electrolyte solute, for example, Li salt such as $LiPF_6$ and/or $LiBF_4$ is preferably used. In addition, as a specific nonaqueous electrolyte solute, for example, Li salt such as $LiPF_6$, $LiBF_4$ is preferably used.

As the positive electrode current collecting lead and the negative electrode current collecting lead, any current collecting lead used in a field of secondary batteries can be used. Such a current collecting lead may be made of a material that can achieve electron movement, and for example, is made of a conductive material such as aluminum, nickel, iron, copper, and stainless steel. The positive electrode current collecting lead is preferably made of aluminum, and the negative electrode current collecting lead is preferably made of nickel. Forms of the positive electrode current collecting lead and the negative electrode current collecting lead are not particularly limited, and may be, for example, wires or plates.

Any external terminal used in the field of secondary batteries can be used as the external terminal. Such an external terminal may be made of a material capable of achieving electron movement, and is usually made of a conductive material such as aluminum, nickel, iron, copper, and stainless steel. An external terminal 5 may be electrically and directly connected with a substrate, or may be electrically and indirectly connected with the substrate with another device interposed therebetween. Note that the present invention is not limited to this, and the positive electrode current collecting lead connected to each of the plurality of positive electrodes may have a function of the positive electrode external terminal, and the negative electrode current collector connected to each of the plurality of negative electrodes may have a function of the negative electrode external terminal.

The exterior body may have the form of the conductive hard case or the flexible case (such as a pouch), as described above.

The conductive hard case includes a main body and a lid. The main body includes a side surface and a bottom having a bottom surface of the exterior body. The main body and the lid are sealed after the electrode assembly, the electrolyte, the current collecting lead, and the external terminal are accommodated. A sealing method is not particularly limited, and for example, a laser irradiation method can be mentioned. As a material constituting the main body and the lid, any material capable of constituting a hard case type exterior body in the field of secondary batteries can be used. Such a material may be any material that can achieve electron movement, and for example, a conductive material such as aluminum, nickel, iron, copper, and stainless steel can be mentioned. Dimensions of the main body and the lid are mainly determined according to dimensions of the electrode assembly. For example, it is preferable to have dimensions such that, when the electrode assembly is accommodated, movement (displacement) of the electrode assembly within the exterior body is prevented. By preventing the movement of the electrode assembly, the electrode assembly is prevented from being destroyed, and safety of the secondary battery is improved.

The flexible case is composed of a soft sheet. The soft sheet only needs to have a degree of softness that can achieve bending of the seal portion, and is preferably a plastic sheet. The plastic sheet is a sheet having a characteristic that deformation due to an external force is maintained when the external force is applied and then removed, and for example, a so-called laminate film can be used. A flexible pouch made of a laminate film can be produced, for example, by superimposing two laminate films and heat-sealing a peripheral edge thereof. As the laminate film, a film obtained by laminating a metal foil and a polymer film is generally used, and specifically, a three-layer structure laminate film composed of an outer layer polymer film, a metal foil, and an inner layer polymer film is exemplified. The outer layer polymer film is for preventing damage to the metal foil due to permeation of moisture, contact, and the like, and a polymer such as polyamide and polyester can be suitably used. The metal foil is for preventing permeation of moisture and gas, and a foil of copper, aluminum, stainless steel, or the like can be suitably used. The inner layer polymer film is for protecting the metal foil from the electrolyte accommodated therein and for melting and sealing at the time of heat sealing, and polyolefin or acid-modified polyolefin can be suitably used.

[Manufacturing Method for Secondary Battery of the Present Invention]

Considering the basic configuration of the secondary battery, a manufacturing method for a secondary battery according to an embodiment of the present invention will be described below.

The inventors of the present application have diligently studied measures to improve manufacturing efficiency of a non-rectangular electrode. As a result, the manufacturing method for the secondary battery of the present invention has been devised.

Prior to describing features of the present invention, terms used in the present specification are defined below. "Non-rectangular electrode" used in the present specification refers to an electrode having a shape that is not square or rectangular in a plan view in a broad sense, and refers to an electrode having a portion where an angle of a corner portion (corner) formed by one side and another side continuous to the one side is not 90 degrees in a plan view in a narrow sense. Examples of "non-rectangular electrode" used herein include at least one selected from the group consisting of an electrode with a cutaway portion, a parallelogram-shaped electrode, a semicircular electrode, a semielliptical electrode, and a pentagonal electrode in a plan view. "Electrode with cutaway portion" used herein refers to an electrode having a shape partially cut away from a square and a rectangle in a plan view.

"Metal sheet material" used herein refers to a sheet-like member made of metal such as copper, extending in a predetermined direction (substantially in one direction), and becoming a current collector (an electrode constituent element) after an electrode precursor is cut. "Extending direction of metal sheet material" used herein refers to a direction in which the metal sheet material extends. "Metal sheet material support" used herein refers to a base portion that supports (a main surface of) the metal sheet material. "Intermittent movement of metal sheet material support/die head" used herein refers to performing movement of the metal sheet material support/die head at a predetermined time interval.

"Electrode material layer raw material" used herein refers to a raw material for an electrode material layer (electrode constituent element) in a broad sense, and refers to a material containing an active material and a binder in a narrow sense. "Electrode precursor" used herein refers to a previous stage of an electrode finally obtained in a broad sense, and refers to a member including a metal sheet material and an electrode material layer raw material provided on the metal sheet material in a planar shape in a narrow sense. "Coating surface of electrode material layer raw material" used herein refers to a surface "composed of electrode material layer raw material" formed by coating the main surface of the metal sheet material with the electrode material layer raw material in a planar shape. "Side portion of coating surface of electrode material layer raw material" used herein refers to an outer edge portion or a contour portion of the coating surface along the extending direction (or a longitudinal direction) in a plan view. "Side portion of coating surface of electrode material layer raw material continuously follows contour of non-rectangular electrode formed" used herein refers to a state in which "all" or "substantially all" of the side portion of the coating surface follows the contour of the non-rectangular electrode in a plan view.

Technical Solution of the Present Invention

Specifically, in order to improve manufacturing efficiency of a non-rectangular electrode by reducing the amount of a surplus portion of an electrode precursor that is formed, the inventors of the present application have diligently researched an alternative coating method. This method is not an extension of a conventional coating method in which "an electrode material layer raw material is applied on/to a metal sheet material (only) in one direction to form a coating surface of a substantially rectangular electrode material layer raw material in a plan view." As a result, the present invention has been devised. Specifically, the inventors of the present application have devised a coating method with a technical solution in which "during application of an electrode material layer raw material, a shape of a coating surface of the electrode material layer raw material is changed based on a shape of a non-rectangular electrode finally formed."

According to such a technical solution, when an electrode material layer raw material is applied on/to a metal sheet material to form an electrode precursor and the formed electrode precursor is cut to form a predetermined non-rectangular electrode, a shape of a coating surface of the electrode material layer raw material can be appropriately changed based on a shape of the non-rectangular electrode that is to be finally formed. As a result, the shape of the coating surface can be made to correspond to (or be associated with or be close to) the shape of the non-rectangular electrode that is to be formed. Therefore, when the electrode precursor is cut to form the non-rectangular electrode, "cutoff portion" that cannot contribute as a constituent element of the non-rectangular electrode can be mainly used as the metal sheet material.

Since this "cutoff portion" can correspond to a surplus portion (discarded portion) of the electrode precursor, the cut-off portion can be mainly used as the metal sheet material. As a result, a proportion of the coating surface of the electrode material layer raw material (that is, the electrode material layer raw material) included in the surplus portion can be relatively reduced as compared with conventional methods. Due to the reduction in the proportion of the electrode material layer raw material included, an amount of the surplus portion can be reduced as a whole as compared with the conventional methods. As a result, it becomes possible to improve manufacturing efficiency of the non-rectangular electrode due to the reduction of the amount of the surplus portion.

A non-rectangular electrode forming steps based on the above technical solution will be specifically described with reference to FIGS. 1(a) to 1(c).

Preparation of Metal Sheet Material (FIG. 1(a))

First, a metal sheet material 110 is prepared.

Figure 1B:
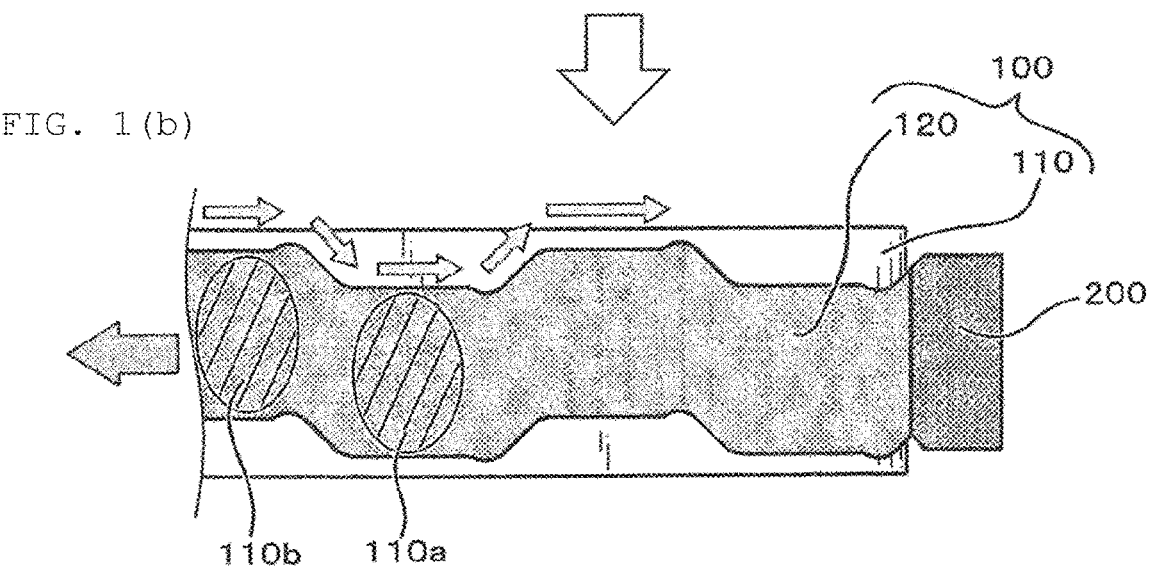

Application of Electrode Material Layer Raw Material (FIG. 1(b))

Next, while the metal sheet material 110 is conveyed onto a coating line, a surface (main surface) of the metal sheet material 110 is coated with an electrode material layer raw material using a die head 200, and a coating surface 120 of the electrode material layer raw material is formed. By forming the coating surface 120, an electrode precursor 100 including the metal sheet material 110 and the coating surface 120 of the electrode material layer raw material can be formed. The present invention is mainly characterized by a formation mode of the coating surface 120 of the electrode material layer raw material. Specifically, in accordance with the technical solution described above, during application of the electrode material layer raw material, a shape of the coating surface 120 of the electrode material layer raw material is changed as appropriate based on a shape of a non-rectangular electrode 10 to be finally formed (see FIG. 1(c)). Note that, although not particularly limited, viscosity of the electrode material layer raw material may be 1 to 10 Pa·s, preferably 2 to 5 Pa·s, and for example, 5 Pa·s.

Pressurization of Electrode Precursor

Although not shown, after the electrode precursor 100 is formed, the electrode precursor 100 is subjected to pressure treatment so as to sandwich both main surfaces of the electrode precursor 100 in order to obtain desired density.

Figure 1C:
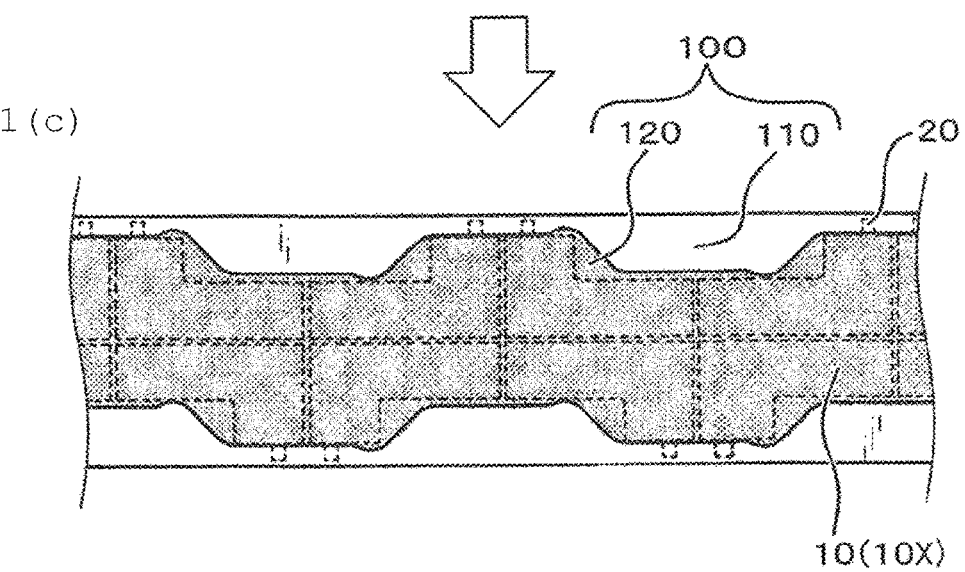

Cutting of Electrode Precursor (FIG. 1(c))

Next, the electrode precursor 100 is cut. Specifically, the electrode precursor 100 is cut so that the non-rectangular electrode 10 is formed in a plan view.

Figure 2:
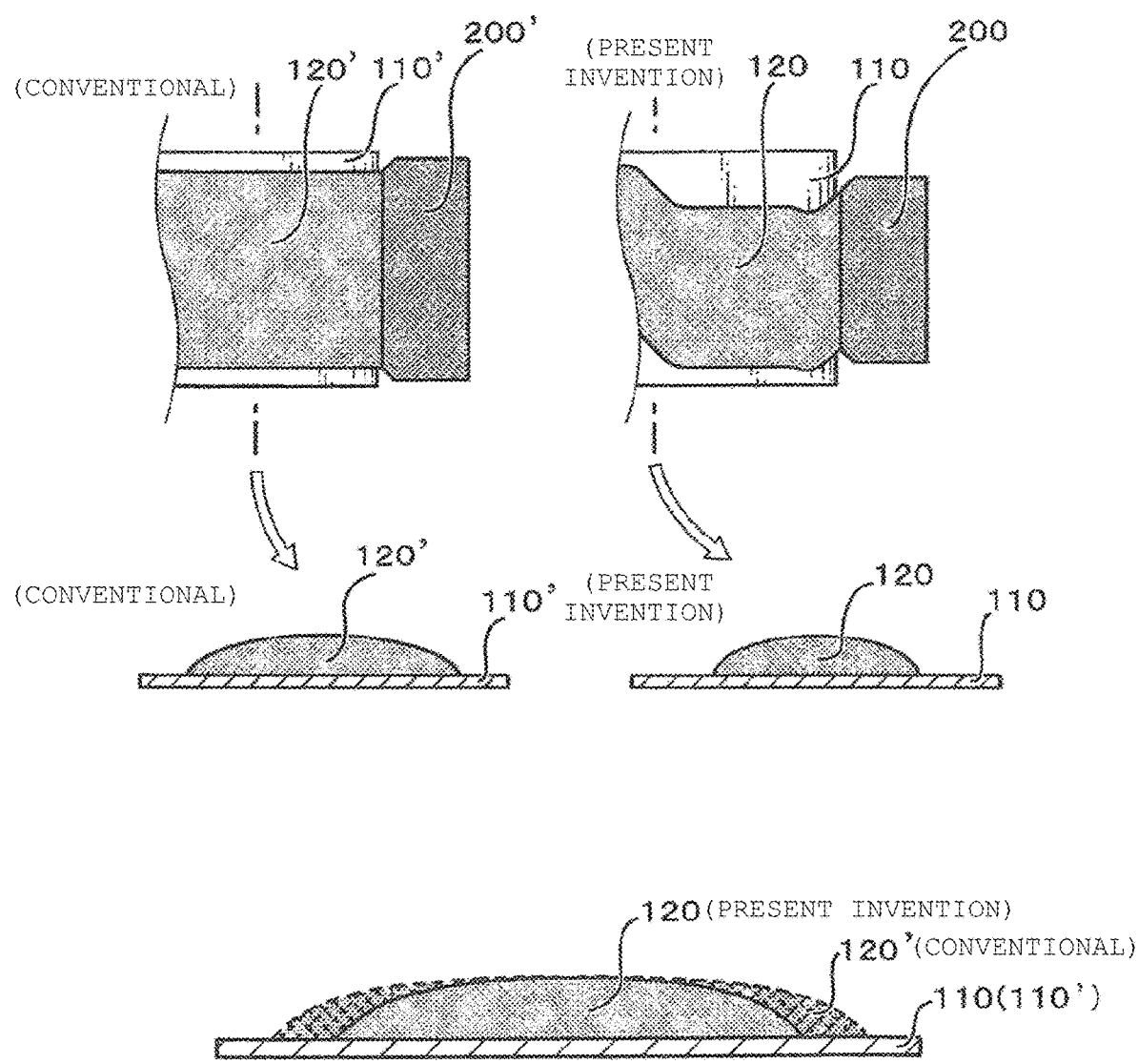
FIG. 2 is a schematic view comparing a coating surface of an electrode material layer raw material of a conventional mode and a coating surface of an electrode material layer raw material of the present invention.

In the present invention, in the electrode material layer raw material application step described above (FIG. 1(b)), the shape of the coating surface 120 of the electrode material layer raw material is changed based on the shape of the non-rectangular electrode 10 that is to be finally formed. Therefore, the shape of the coating surface 120 can be made to correspond to the shape of the non-rectangular electrode 10 that is to be formed. Therefore, when the electrode precursor 100 is cut to form the non-rectangular electrode 10, a "cutoff portion" that cannot contribute as a constituent element of the non-rectangular electrode 10 can be mainly used as the metal sheet material 100. In other words, when the electrode precursor 100 is cut to form the non-rectangular electrode 10, a proportion of the coating surface 120 of the electrode material layer raw material (i.e., the electrode material layer raw material) included in "cutoff portion" that cannot contribute as the constituent element of the non-rectangular electrode 10 can be relatively reduced as compared with the conventional methods in which the electrode material layer raw material is applied on/to the metal sheet material 110' (only) in one direction to form the coating surface 120' (see FIG. 2). Due to the reduction in the proportion of the electrode material layer raw material included, an amount of a surplus portion that can be generated during cutting of the electrode precursor 100 can be reduced as a whole as compared with the conventional methods.

Formation of Non-Rectangular Electrode

As described above, a plurality of non-rectangular electrodes 10 (with tabs 20) with improved manufacturing efficiency can be obtained due to the reduction in the amount of the surplus portion.

Specific Explanation Regarding Technical Solution of the Present Invention

Hereinafter, the technical solution of the present invention in which during application of the electrode material layer raw material, a shape of the coating surface 120 of the electrode material layer raw material is appropriately changed based on the shape of the non-rectangular electrode 10 to be finally formed will be specifically described.

In the present invention, the shape of the coating surface 120 can be changed based on the shape of the non-rectangular electrode 10 that to be formed according to the following mode. Specifically, in a plan view, based on the shape of the non-rectangular electrode 10 to be formed, a position where the electrode material layer raw material is applied to a predetermined region 110a of the metal sheet material 110 is shifted from a position where the electrode material layer raw material is applied to another region 110b other than the predetermined region 110a in a direction different from an extending direction of the metal sheet material 110 (FIGS. 1(b) and 1(c)). The shape of the coating surface 120 can be suitably changed in a plan view by shifting a coating position of the electrode material layer raw material in the direction different from the extending direction of the metal sheet material 110. The suitable change in the shape of the coating surface 120 by shifting the coating position can lead to formation of the coating surface 120 including side portions extending in a direction different from the extending direction of the metal sheet material 110.

From the above, in the present invention, it is possible to suitably obtain the coating surface 120 having the shape different from the conventional shape (substantially rectangular shape) of the coating surface of the electrode material layer raw material obtained by applying the electrode material layer raw material onto the main surface of the metal sheet material 110 only in one direction (specifically, in a direction substantially parallel to an extending direction of the metal sheet material) (FIGS. 1(b) and 1(c)). In particular, when more suitable shift control of the coating position of the electrode material layer raw material is performed in consideration of the shape of the non-rectangular electrode 10 that can be formed in advance, the coating surface 120 can be formed so that the side portions continuously follow a contour of the non-rectangular electrode 10 that can be formed in a plan view. This is a feature of the present invention.

(Specific Mode for Shifting Coating Position of Electrode Material Layer Raw Material)

Hereinafter, a specific mode for shifting the coating position of the electrode material layer raw material will be described.

Movement Control of Die Head

Figure 3A:
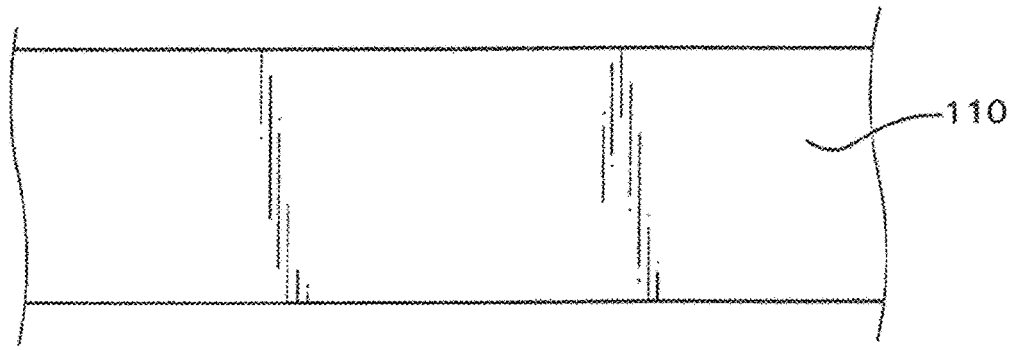
FIGS. 3(a) to 3(c) are schematic views of a mode in which a die head is moved.
Figure 3B:
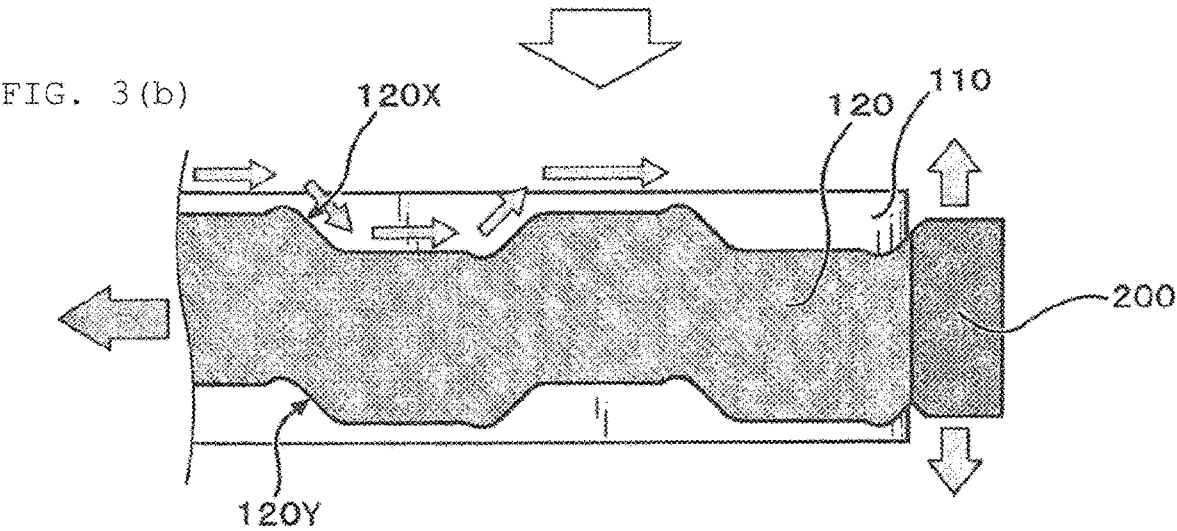
Figure 3C:
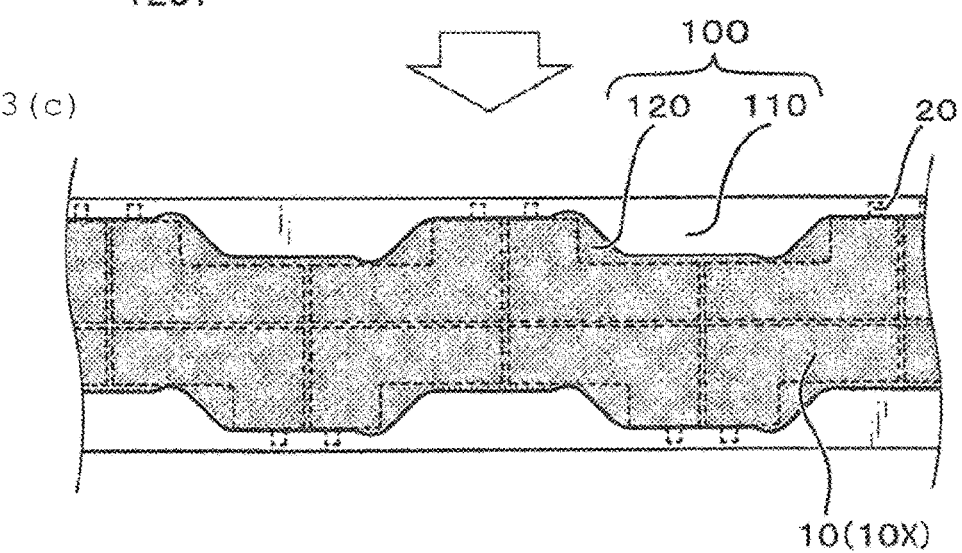

In one mode, it is preferable that the shape of the coating surface 120 of the electrode material layer raw material be changed by intermittently moving the die head 200 for applying the electrode material layer raw material in a direction perpendicular to the extending direction of the metal sheet material 110 from a predetermined position (see FIGS. 3(a) to 3(c)).

The present mode is characterized in that the shape of the coating surface 120 of the electrode material layer raw material is changed by intermittently moving the die head 200 in the direction perpendicular to the extending direction of the metal sheet material 110 (that is, a width direction of the metal sheet material 110).

Specifically, in the present mode, the die head 200 is intermittently moved in the width direction of the metal sheet material 110 in consideration of the shape of the non-rectangular electrode 10 to be finally formed, thereby intentionally shifting a coating position of the electrode material layer raw material. By such a shift control of the coating position, the shape of the coating surface 120 of the electrode material layer raw material can be made to correspond to the shape of the non-rectangular electrode 10 to be finally formed. Therefore, when the electrode precursor 100 is cut to form the non-rectangular electrode 10 accordingly, a proportion of the coating surface 120 of the electrode material layer raw material included in "cutoff portion" that cannot contribute as a constituent element of the non-rectangular electrode 10 can be relatively reduced as compared with the conventional methods.

Note that in this mode, the non-rectangular electrode is formed through the following steps (see FIGS. 3(a) to 3(c)). Note that description overlapping with the mode shown in FIGS. 1(a) to 1(c) is omitted or simplified.

Preparation of Metal Sheet Material (FIG. 3(a))

First, the metal sheet material 110 is prepared.

Application of Electrode Material Layer Raw Material (FIG. 3(b))

Next, while the metal sheet material 110 is conveyed onto the coating line, the surface (main surface) of the metal sheet material 110 is coated with the electrode material layer raw material using the die head 200, and the coating surface 120 of the electrode material layer raw material is formed. Specifically, the die head 200 is intermittently moved upward or downward along the width direction of the metal sheet material 110 in consideration of the shape of the non-rectangular electrode 10 that can be finally formed, thereby intentionally shifting a coating position of the electrode material layer raw material. Such a shift control of the coating position makes it possible to form the coating surface 120 having a shape corresponding to or related to the shape of the non-rectangular electrode 10 to can be formed. By forming the coating surface 120, the electrode precursor 100 including the metal sheet material 110 and the coating surface 120 of the electrode material layer raw material can be formed.

Pressurization of Electrode Precursor

Although not shown, after the electrode precursor 100 is formed, the electrode precursor 100 is subjected to pressure treatment so as to sandwich both main surfaces of the electrode precursor 100 in order to obtain a desired density.

Cutting of Electrode Precursor (FIG. 3(*c*))

Next, the electrode precursor 100 is cut. Specifically, the electrode precursor 100 is cut so that the non-rectangular electrode 10 is formed in a plan view.

In the present mode, in the electrode material layer raw material application step described above (FIG. 3(*b*)), it is possible to form the coating surface 120 having the shape corresponding to or related to the shape of the non-rectangular electrode 10 to be formed. Therefore, when the electrode precursor 100 is cut to form the non-rectangular electrode 10, a proportion of the coating surface 120 of the electrode material layer raw material included in "cutoff portion" that cannot contribute as a constituent element of the non-rectangular electrode 10 can be relatively reduced as compared with the conventional mode. As described above, it is possible to reduce an amount of a surplus portion of the electrode precursor 100 that can be generated during the cutting.

Further, besides the movement control of the die head, a specific mode for shifting the coating position of the electrode material layer raw material may include the following.

Movement Control of Metal Sheet Material Support

Figure 4A:
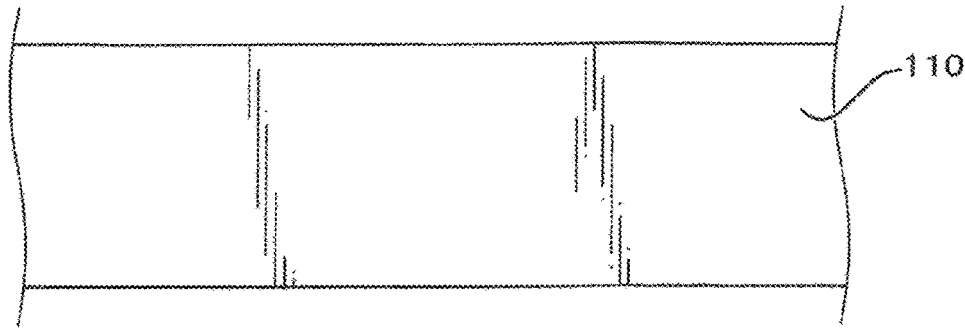
FIGS. 4(a) to 4(c) are schematic views of a mode in which a metal sheet material support is moved.
Figure 4B:
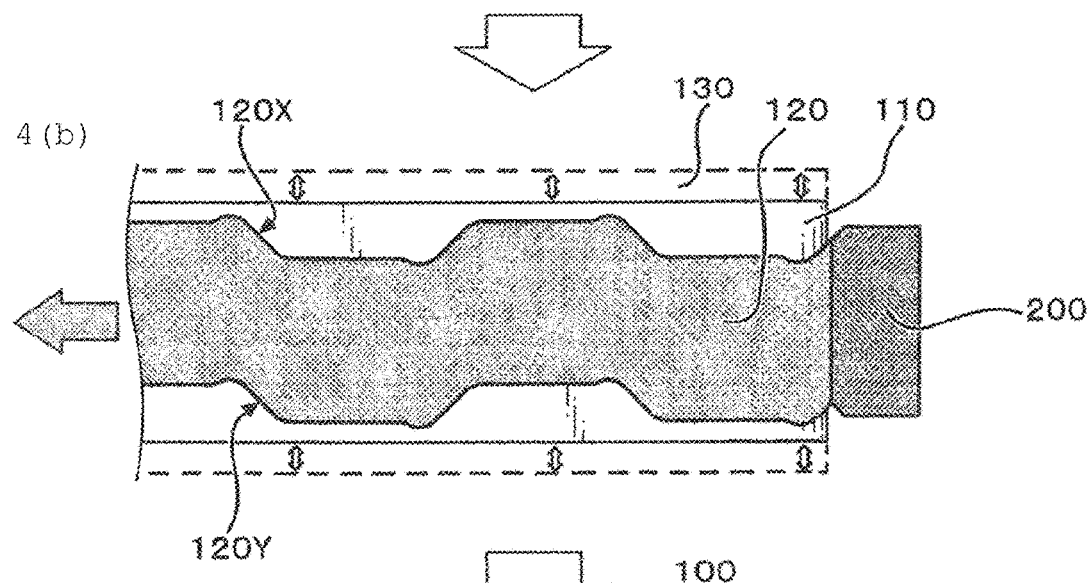

In one mode, it is preferable that the shape of the coating surface 120 be changed by intermittently moving a metal sheet material support that supports the metal sheet material 110 from a predetermined position in a direction perpendicular to the extending direction of the metal sheet material 110 (see FIGS. 4(*a*) to 4(*c*)).

The present mode is characterized in that a metal sheet material support 130 that supports the metal sheet material 110 is intermittently moved in the direction perpendicular to the extending direction of the metal sheet material 110 (that is, the width direction of the metal sheet material 110). Specifically, in the present mode, the metal material sheet material support 130 is intermittently moved in the width direction of the metal sheet material 110 in consideration of the shape of the non-rectangular electrode 10 to be finally formed, thereby intentionally shifting a coating position of the electrode material layer raw material. By such a shift control of the coating position, the shape of the coating surface 120 of the electrode material layer raw material can be made to correspond to the shape of the non-rectangular electrode 10 to be finally formed. Therefore, when the electrode precursor 100 is cut to form the non-rectangular electrode 10 accordingly, a proportion of the coating surface 120 of the electrode material layer raw material included in "cutoff portion" that cannot contribute as a constituent element of the non-rectangular electrode 10 can be relatively reduced as compared with the conventional mode.

In the present mode, a non-rectangular electrode is formed through the following steps (see FIGS. 4(*a*) to 4(*c*)). Note that description overlapping with the mode shown in FIGS. 1(*a*) to 1(*c*) is omitted or simplified.

Preparation of Metal Sheet Material (FIG. 4(*a*))

First, the metal sheet material 110 is prepared.

Application of Electrode Material Layer Raw Material (FIG. 4(*b*))

Next, while the metal sheet material 110 is conveyed onto the coating line, the surface (main surface) of the metal sheet material 110 is coated with the electrode material layer raw material using the die head 200, and the coating surface 120 of the electrode material layer raw material is formed. Specifically, the metal sheet material support 130 is intermittently moved upward or downward along the width direction of the metal sheet material 110 in consideration of the shape of the non-rectangular electrode 10 to be finally formed, thereby intentionally shifting a coating position of the electrode material layer raw material. Such a shift control of the coating position makes it possible to form the coating surface 120 having a shape corresponding to or related to the shape of the non-rectangular electrode 10 that can be formed. By forming the coating surface 120, the electrode precursor 100 including the metal sheet material 110 and the coating surface 120 of the electrode material layer raw material can be formed.

Pressurization of Electrode Precursor

Although not shown, after the electrode precursor 100 is formed, the electrode precursor 100 is subjected to pressure treatment so as to sandwich both main surfaces of the electrode precursor 100 in order to obtain desired density.

Cutting of Electrode Precursor (FIG. 4(*c*))

Next, the electrode precursor 100 is cut. Specifically, the electrode precursor 100 is cut so that the non-rectangular electrode 10 is formed in a plan view.

In the present mode, in the above-described electrode material layer raw material application step (FIG. 4 (*b*)), it is possible to form the coating surface 120 having a shape corresponding to or related to the shape of the non-rectangular electrode 10 to be formed. Therefore, when the electrode precursor 100 is cut to form the non-rectangular electrode 10, a proportion of the coating surface 120 of the electrode material layer raw material included in "cutoff portion" that cannot contribute as a constituent element of the non-rectangular electrode 10 can be relatively reduced as compared with the conventional mode. As described above, it is possible to reduce an amount of a surplus portion of the electrode precursor 100 that can be generated during the cutting.

Note that, in either one of the modes shown in FIGS. 3 and 4, the die head 200/metal sheet material support 130 is intermittently moved upward or downward along the width direction of the metal sheet material 110. More specifically, the die head 200 and the metal sheet material support 130 cannot be simultaneously moved both upward and downward along the width direction of the metal sheet material 110 due to their structural characteristics. Therefore, due to such structural characteristics, one side portion 120X and another side portion 120Y of the coating surface 120 facing each other can be oriented in the same direction in a plan view. In other words, in a plan view, it may be impossible to orient the one side portion 120X and the other side portion 120Y of the coating surface 120 facing each other in different directions due to the structural characteristics of the die head and/or the metal sheet material support. It can be said that the above point is also a feature when the die head/metal sheet material support is intermittently moved upward or downward along the width direction of the metal sheet material 110.

Further, when the intermittent upward or downward movement along the width direction of the metal sheet material 110 is carried out with a certain periodicity in consideration of the shape of the non-rectangular electrode 10 to be finally formed and/or the cutting mode of the electrode precursor 100, a coating surface 120 having a shape with a certain periodicity can be obtained accordingly (see FIGS. 3(*b*) and 4(*b*)). If the shape of the coating surface 120 has a certain periodicity, uneven distribution of cutting loads when the electrode precursor 100 is cut later due to this can be suitably avoided. Therefore, problems such as local peeling of the electrode material layer raw material 120 and difficulty in forming the tab 20 can be suitably avoided. In addition, if the shape of the coating surface 120 has certain periodicity, when the electrode precursor 100 is cut later due to this, a plurality of non-rectangular electrodes 10 having the same form (shape and dimensions) can be efficiently formed, while occurrence of a surplus portion of the electrode precursor 100 is efficiently reduced.

(Cutting Mode of Electrode Precursor for Forming a Plurality of Non-Rectangular Electrodes)

Hereinafter, a mode in which the electrode precursor is cut to form a plurality of non-rectangular electrodes will be described.

Figure 4C:
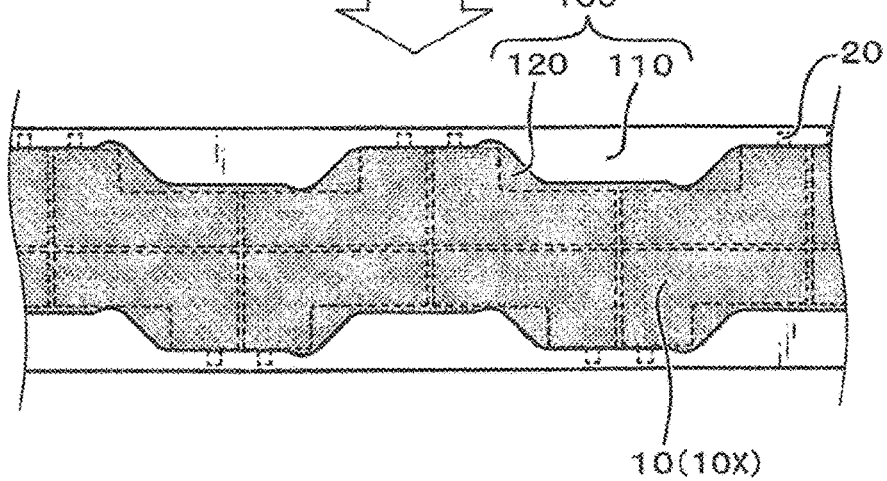
Figure 5:
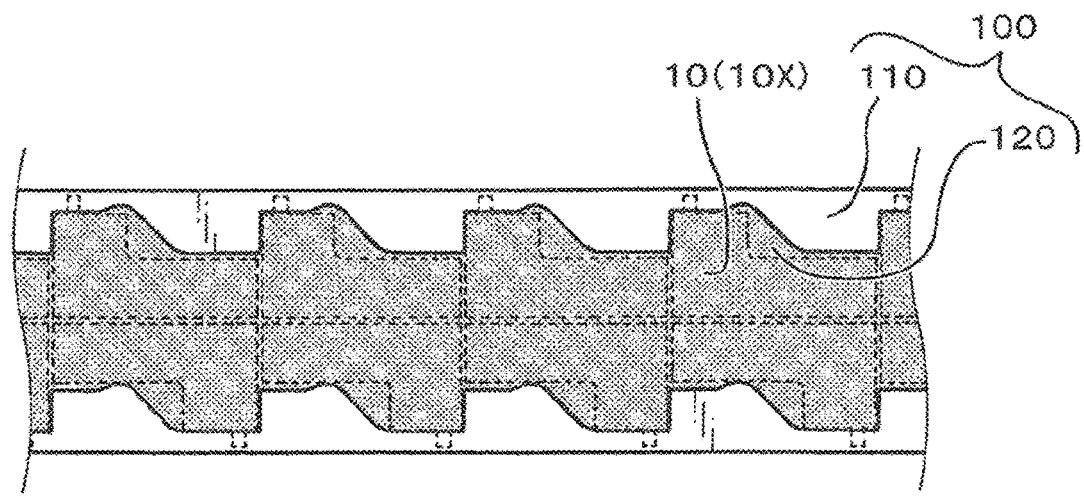
FIG. 5 is a schematic view of another cutting mode of an electrode precursor.

Specifically, in this mode, it is preferable to cut the electrode precursor 100 so that the plurality of non-rectangular electrodes 10 formed is arranged in point symmetry with each other along a direction perpendicular to the extending direction of the metal sheet material 110 (that is, the width direction of the metal sheet material 110) in a plan view (see FIGS. 3(c) and 4(c)).

As described above, in both the modes shown in FIGS. 3 and 4, due to the structural characteristics of the die head 200/metal sheet material support 130, the one side portion 120X and the other side portion 120Y of the coating surface 120 facing each other can be oriented in the same direction in a plan view. Therefore, due to this, certain restrictions may occur in the cutout of the non-rectangular electrode 10. Therefore, during cutting of the electrode precursor 100, it is preferable to cut the electrode precursor 100 so that the plurality of non-rectangular electrodes 10 formed is arranged in point symmetry with each other along the width direction of the metal sheet material 110 from the viewpoint of efficiently forming a plurality of non-rectangular electrodes 10 having the same form (shape and dimensions), while efficiently reducing occurrence of a surplus portion of the electrode precursor 100 (see FIGS. 3(c) and 4(c)).

Further, the electrode precursor 100 may be cut so that the plurality of non-rectangular electrodes 10 formed is arranged in line symmetry with each other along the extending direction of the metal sheet material 110 in a plan view (see FIGS. 1(c), 3(c), 4(c), etc.). When a cutting shape of the electrode precursor 100 is controlled so that the plurality of non-rectangular electrodes 10 formed is arranged in line symmetry with each other along the extending direction of the metal sheet material 110, uneven distribution of cutting loads during cutting of the electrode precursor 100 caused by this can be suitably avoided. Therefore, problems such as local peeling of the electrode material layer raw material 120 and difficulty in forming the tab 20 can be suitably avoided. Note that without being limited thereto, while the plurality of non-rectangular electrodes 10 formed is arranged in point symmetry with each other along the width direction of the metal sheet material 110, it does not have to be arranged in line symmetry with each other in the extending direction of the metal sheet material 110.

(Shape that Non-Rectangular Electrode can Take)

Figure 6A:
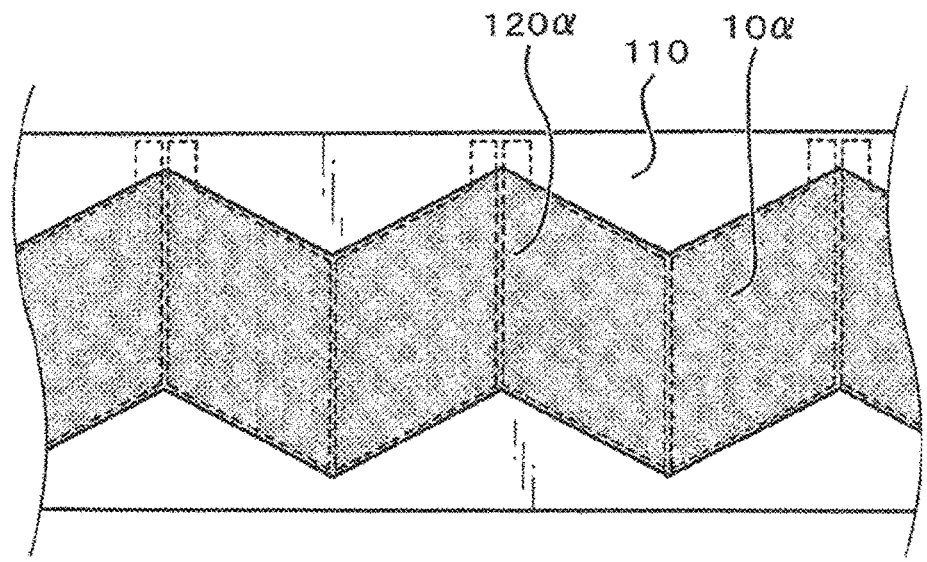
FIGS. 6(a) to 6(c) are schematic views of a non-rectangular electrode having a shape that can be taken other than an electrode with a cutaway portion.
Figure 6B:
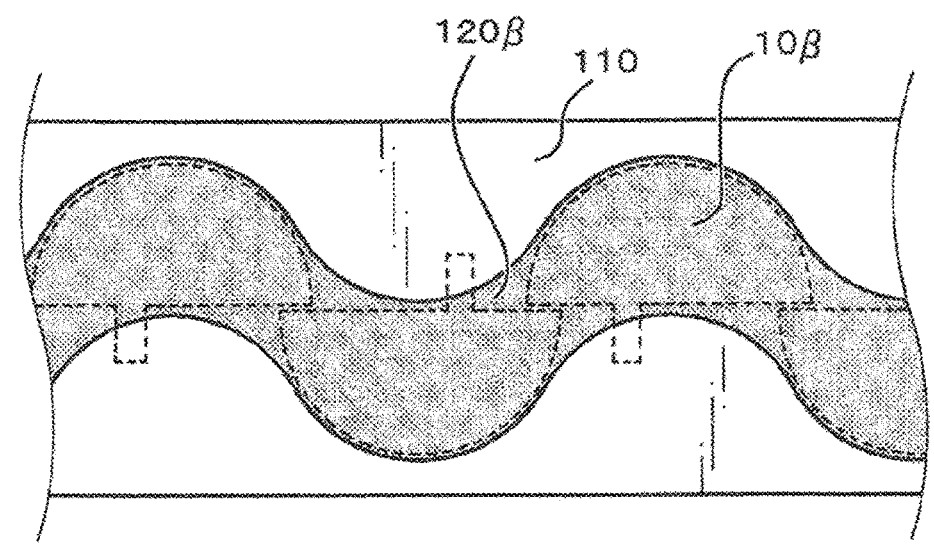
Figure 6C:
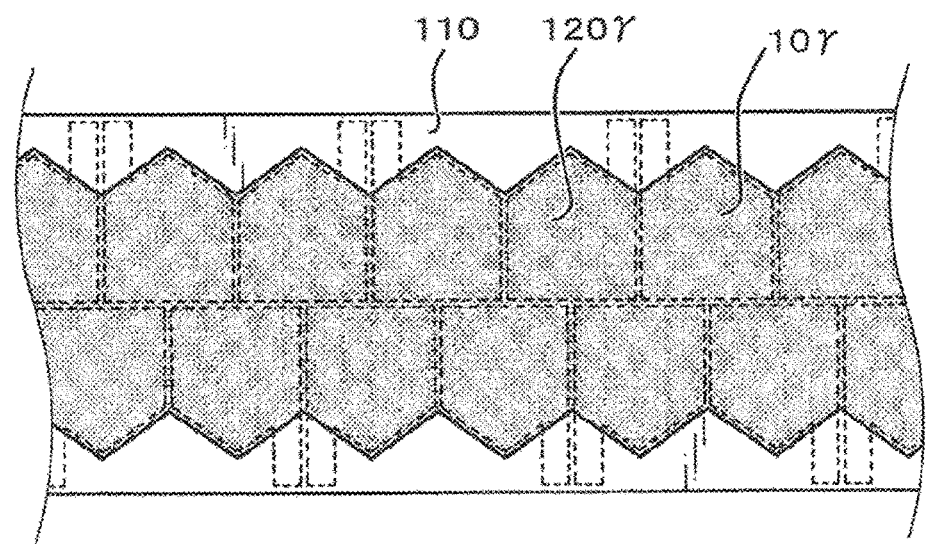

The non-rectangular electrode obtained by the manufacturing method for the present invention described so far is not limited to an electrode 10X with a cutaway portion shown in FIGS. 1(c), 3(c), 4(c) and 5. Assuming that a shape of a coating surface (120α, 120β, 120γ) of an electrode material layer raw material can be made to correspond to (or be associated with or be close to) the shape of the non-rectangular electrode finally formed, for example, the coating surface can take a shape of a parallelogram-shaped electrode 10α (FIG. 6(a)), a semicircular or semielliptical electrode 10β (FIG. 6(b)), a pentagonal electrode 10γ (FIG. 6(c)), etc.

(Tab Location)

As described above, in the present invention, the shape of the coating surface of the electrode material layer raw material can be made to correspond to (or be associated with or be close to) the shape of the non-rectangular electrode finally formed. Therefore, particularly, when the electrode 10X with the cutaway portion is used as the non-rectangular electrode, the following effects can be achieved. Specifically, in the conventional methods, when a tab is positioned in a cutaway region of an electrode with a cutaway portion by cutting an electrode precursor, the electrode material layer raw material is provided on a portion that can become the tab. Therefore, it is necessary to locally remove the electrode material layer raw material on the portion that can become the tab after the electrode precursor is cut.

Figure 7:
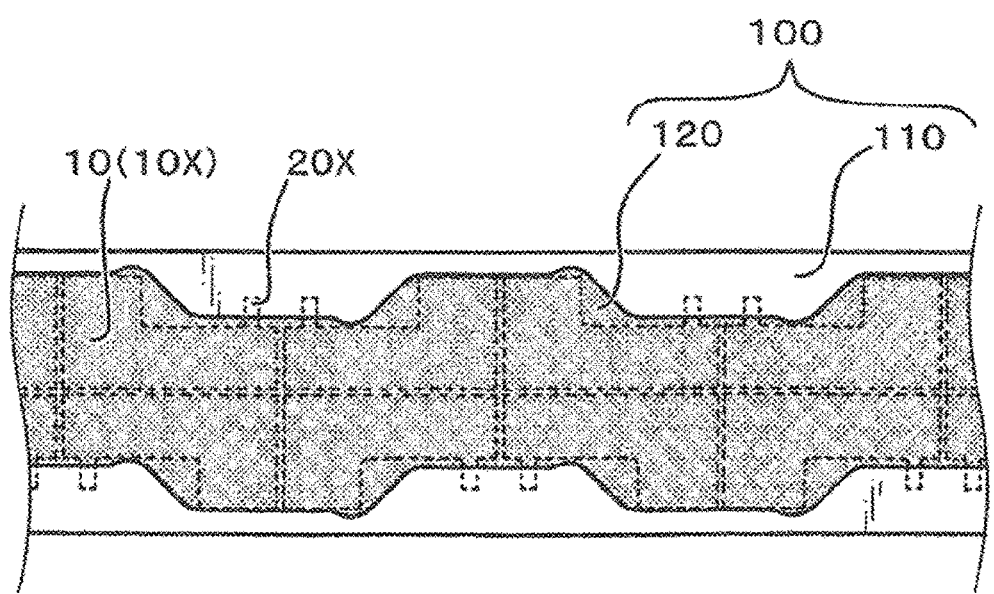
FIG. 7 is a schematic view of an arrangement location where a tab can take.

On the other hand, in the present invention, since the shape of the coating surface 120 of the electrode material layer raw material can be made to correspond to the shape of the non-rectangular electrode 10 finally formed, the electrode material layer raw material is reduced in a cutaway region of the electrode 10X with the cutaway portion that can be formed. Therefore, when a tab 20X is positioned in the cutaway region of the electrode 10X with the cutaway portion by cutting the electrode precursor, the electrode material layer raw material may not be provided on a portion that can become the tab 20X. See FIG. 7. Therefore, it is possible to avoid a step of locally removing the electrode material layer raw material on the portion that can become the tab 20X after the electrode precursor 100 is cut. Due to the avoidance of the electrode material layer raw material local removing step, it is possible to improve manufacturing efficiency of the non-rectangular electrode 10.

A secondary battery according to one embodiment of the present invention can be used in various fields where power storage is needed. By way of example, the secondary battery according to one embodiment of the present invention, particularly the non-aqueous electrolyte secondary battery, can be used in: an electric/information/communication field in which a mobile device is used (for example, a mobile device such as a mobile phone, a smartphone, a notebook computer, and a digital camera); home/small industrial application (for example, a power tool, a golf cart, and a home/nursing/industrial robot); large industrial application (for example, a forklift, an elevator, and a harbor crane); a transportation system field (for example, a hybrid vehicle, an electric vehicle, a bus, a train, an electric assist bicycle, and an electric motorcycle); power system application (for example, various power generation, a road conditioner, a smart grid, and a general home installation storage system); and space and deep sea application (for example, a space probe and a submersible research vessel).

DESCRIPTION OF REFERENCE SYMBOLS

10: Non-rectangular electrode
10': Non-rectangular electrode (conventional)
10X: Electrode with cutaway portion
10α: Parallelogram-shaped electrode
10β: Semicircular or semielliptical electrode
10γ: Pentagonal electrode
20: Tab
20X: Tab provided in cutaway region of electrode 10X with cutaway portion
100: Electrode precursor
100': Electrode precursor (conventional)
100X': Surplus portion of electrode precursor 100' after cutting (conventional)
110: Metal sheet material 110': Metal sheet material (conventional)
110a: Predetermined region of metal sheet material 110
110b: Region other than predetermined region 110a of metal sheet material 110
120: Coating surface of electrode material layer raw material
120': Coating surface of electrode material layer raw material
120X: One side portion of coating surface 120
120Y: Another side portion of coating surface 120
120α: Coating surface of electrode material layer raw material (for parallelogram-shaped electrode)
120β: Coating surface of electrode material layer raw material (for semicircular or semielliptical electrode)
120γ: Coating surface of electrode material layer raw material (for pentagonal electrode)
130: Metal sheet material support
200: Die head

The invention claimed is:

1. A manufacturing method for a secondary battery, the method comprising:
    coating a metal current collector sheet material with an electrode material layer raw material by shifting a first position of a first predetermined region where the electrode material layer raw material is applied to the metal current collector sheet material to a second position of a second predetermined region where the electrode material layer raw material is applied to the metal current collector sheet in a direction different from an extending direction of the metal sheet material such that a shape of a coating surface of the electrode material layer raw material is changed based on a shape of a non-rectangular electrode to be formed to form an electrode precursor; and
    cutting the electrode precursor into a plurality of non-rectangular electrodes such that, in a plan view of the metal current collector sheet material, the plurality of non-rectangular electrodes are arranged in point symmetry with each other along a direction perpendicular to an extending direction of the metal current collector sheet material.

2. The manufacturing method according to claim 1, wherein at least a part of a side portion of the coating surface extends in a direction different from an extending direction of the metal current collector sheet material in a plan view thereof.

3. The manufacturing method according to claim 1, wherein, in a plan view of the metal current collector sheet material, at least one side portion of the coating surface is formed so as to continuously follow a contour of the non-rectangular electrode to be formed.

4. The manufacturing method according to claim 1, wherein the shape of the coating surface is changed by intermittently moving a die head for coating the electrode material layer raw material from a predetermined position in a direction perpendicular to an extending direction of the metal current collector sheet material.

5. The manufacturing method according to claim 4, wherein the intermittent moving of the die head is carried out such that the shape of the coating surface has periodicity.

6. The manufacturing method according to 4, wherein with the intermittent moving of the die head, a first side portion and a second side portion of the coating surface that face each other are oriented in a same direction in a plan view of the metal current collector sheet material.

7. The manufacturing method according to claim 1, wherein the shape of the coating surface is changed by intermittently moving a metal current collector sheet material support that supports the metal current collector sheet material from a predetermined position in the direction perpendicular to an extending direction of the metal current collector sheet material.

8. The manufacturing method according to claim 7, wherein the intermittent moving of the metal current collector sheet material support is carried out such that the shape of the coating surface has periodicity.

9. The manufacturing method according to 7, wherein with the intermittent moving of the metal current collector sheet material support, a first side portion and a second side portion of the coating surface that face each other are oriented in a same direction in a plan view of the metal current collector sheet material.

10. The manufacturing method according to claim 1, wherein in the plan view, the plurality of non-rectangular electrodes are arranged in line symmetry with each other along the extending direction of the metal current collector sheet material.

11. The manufacturing method according to claim 1, wherein a shape of the non-rectangular electrode includes at least one selected from an electrode with a cutaway portion, a semicircular electrode, a semielliptical electrode, and a pentagonal electrode in a plan view of the metal current collector sheet material.

12. The manufacturing method according to claim 1, wherein a shape of the non-rectangular electrode includes a cutaway portion, and the method further comprises forming a tab in the cutaway portion by cutting the electrode precursor and a portion of the metal current collector sheet material in the cutaway portion that does not include the electrode material layer raw material.

13. The manufacturing method according to claim 1, further comprises forming a tab for the non-rectangular electrode by cutting the electrode precursor and a portion of the metal current collector sheet material that does not include the electrode material layer raw material.

14. The manufacturing method according to claim 1, wherein the electrode material layer raw material includes a material that contributes to occluding and releasing lithium ions.

* * * * *